P. W. PRATT.
ELASTIC TREAD FOR BOOTS AND SHOES.
APPLICATION FILED JAN. 26, 1906. RENEWED MAR. 13, 1909.
936,810.
Patented Oct. 12, 1909.
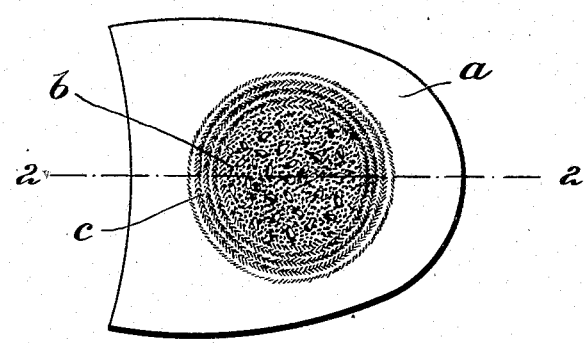
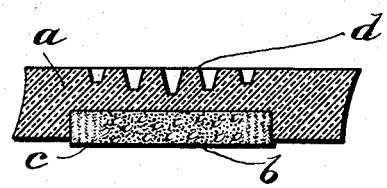

UNITED STATES PATENT OFFICE.

PHILIP W. PRATT, OF BOSTON, MASSACHUSETTS, ASSIGNOR TO CHARLES F. BROWN, TRUSTEE, OF READING, MASSACHUSETTS.

ELASTIC TREAD FOR BOOTS AND SHOES.

936,810.

Specification of Letters Patent.

Patented Oct. 12, 1909.

Application filed January 26, 1906, Serial No. 297,965. Renewed March 13, 1909. Serial No. 483,295.

*To all whom it may concern:*

Be it known that I, PHILIP W. PRATT, of Boston, in the county of Suffolk and State of Massachusetts, have invented certain new and useful Improvements in Elastic Treads for Boots and Shoes, of which the following is a specification.

This invention relates to treads for boot and shoe heels and soles, comprising a body portion of rubber, and a non-slipping plug or plugs embedded in the rubber body and forming a part of the tread surface, which presents greater frictional resistance to slipping movement of the tread on the surfaces with which it comes in contact than is presented by the rubber of which the body is composed.

The invention consists in an elastic tread comprising a body portion of rubber, which includes the marginal portions of the tread-piece, and one or more plugs composed of a mixture of rubber and cork reduced to small fragments embedded in the rubber, the cork fragments being held by the rubber of the plug, the margin of the plug being formed by a ring of textile material, as hereinafter described. One face of the plug is exposed, and forms a part of the tread surface, said face being substantially flush with or projecting slightly beyond the tread face of the all-rubber body. The plug is inserted in the body, so that its margin is covered by the material of the body, the cork fragments in the margin of the plug being thus confined by the surrounding portion of the all-rubber body, and prevented from dropping out or being dislodged. The tread thus formed differs from a tread the entire body of which is composed of a mixture of rubber and cork fragments, in that the margin of the tread is homogeneous, and does not present cork fragments. The said margin is therefore of uniform color, and its continuity is not liable to be interrupted by the removal of cork fragments, as would be the case if the entire body were composed of a mixture of rubber and cork. Moreover, the all-rubber margin, besides being of uniform color, is capable of being trimmed to conform to the shape of the leather heel or sole to which the elastic tread is applied; whereas, a margin composed in part of cork fragments cannot be thus trimmed, without dislodging some of the cork fragments and giving the trimmed margin a pitted surface.

Of the accompanying drawings, forming a part of this specification, Figure 1 represents a side view of an elastic heel-tread embodying my invention. Fig. 2 represents a section on line 2—2 of Fig. 1.

The same reference characters indicate the same parts in both figures.

In the drawings,—*a* represents an elastic tread-piece or body, which is composed of rubber or of a composition of which rubber is an ingredient, said composition being homogeneous, in that its texture and color are uniform.

*b* represents a plug composed of a mixture of rubber and cork-fragments, the latter being embedded in the rubber and confined by it. The plug is inserted in the body *a*, one side of the plug being exposed as a part of the tread surface, while the margin and the other side are covered by the homogeneous material of the body. The cork fragments on the margin of the plug are thus confined, and prevented from dropping out, while the cork-fragments on the tread-face are as a rule held in place by the pressure of the tread face against the ground, pavement, or floor. The plug *b* is surrounded by a ring *c* composed of convolutions of duck or other textile fabric, the object of the ring being to present a non-slipping annular tread surface. The cork fragments do not extend to the margin of the body *a*, hence said margin presents the usual appearance of an all-rubber tread, and is adapted to be trimmed and finished in the usual manner. The ring *c* has greater wear-resistance qualities than the center part composed of rubber and cork. Therefore the plug, instead of wearing away at its margin and acquiring a crowning shape, will become slightly dished by wear, and is therefore less liable to slip.

The tread-piece on its side opposite to that in which the plug is embedded, is recessed, and provided with a number of discontinuous pyramidal or conical projections *d* rising from the bottom of the recess and terminating flush with the surface of the piece. Thus there are formed spaces entirely surrounding unsupported posts, whereby the stiffness and resistance to compression of the tread are diminished at the portion where the plug is located. This compensates for the additional stiffness given by the less yielding plug, so that the tread body is of uniform softness and resilience throughout.

The plug b and body a are molded before the rubber contained in said parts is vulcanized, and they are united by vulcanization after they are assembled, this being the ordinary method of uniting a wear-resisting plug to a rubber body. Heretofore a tread of this character has been made by assembling a plug made by coiling a strip of textile fabric coated with unvulcanized rubber, and an unvulcanized rubber body, and then permanently uniting said parts by vulcanization, as shown, for example, in Letters Patent of the United States No. 769,324. In a tread having a coiled fabric tread, the rubber ingredient of the tread at the upper or inner end of the tread is limited to the narrow lines between the convolutions of the fabric. Hence there is a limited union between the rubber ingredient of the tread and the rubber of the body. My tread b on the other hand presents a much greater proportion of rubber at its inner end, the continuity of the rubber being interrupted only by the surface particles or pieces of cork. I am enabled therefore to secure a firmer union between the inner end of the plug and the body by vulcanization than heretofore. The ring c of textile material, forming the margin of the plug, offers more resistance to wear than the rubber and cork portion of the plug and the surrounding rubber body of the plug. Hence the wear to which the tread surface of the heel is subjected, causes the textile ring c to form an annular ridge, projecting slightly from the tread surface, and increasing the frictional hold of said surface on the pavement or ground, thus reducing the liability of slippage.

I claim:

An elastic tread composed of a homogeneous elastic body and a plug composed of a mixture of rubber and cork forming the center of the plug, and a ring of textile material surrounding the said center, and forming the margin of the plug, the said plug being inserted in the elastic body with its margin covered by the material of the body, the said parts being united by vulcanization.

In testimony whereof I have affixed my signature, in presence of two witnesses.

PHILIP W. PRATT.

Witnesses:
  C. F. BROWN,
  E. BATCHELDER.